Patented July 28, 1953

2,647,142

UNITED STATES PATENT OFFICE 2,647,142

PRODUCTION OF GLUTAMIC ACID

Forest A. Hoglan, Glenview, Ill., assignor to International Minerals & Chemical Corporation, a corporation of New York No Drawing. Application May 24, 1952, Serial No. 289,895

13 Claims. (Cl. 260—529)

This invention relates to the mineral acid hydrolysis of a proteinaceous substance. More particularly this invention has reference to the sulfuric acid hydrolysis of a proteinaceous substance and the subsequent production of substantially pure L-glutamic acid, other amino acids, ash-free protein hydrolysate end liquors, and fractions thereof.

The hydrolysis of proteinaceous substances is accomplished conveniently by heating said compositions under appropriate conditions with sulfuric acid, hydrochloric acid, or other mineral acids. The resultant hydrolysate comprises essentially individual amino acids in acidic solution. The hydrolysate may then be variously treated to isolate individual amino acids and solutions containing a mixture of amino acids. The separation of individual amino acids is generally accomplished by adjusting the pH of the hydrolysate either to neutrality or to the isoelectric point of any particular amino acid desired to be recovered from the hydrolysate. It is known, for example, that amino acids such as tyrosine and leucine may be removed from the acidic hydrolysate of wheat gluten by adjusting the pH of the hydrolysate to between about 5.0 and about 7.0 with alkaline earth metal or alkali metal oxides or hydroxides, and concentrating the resultant solution beyond the saturation point of tyrosine and leucine. The solution from which these amino acids have been removed may then be adjusted to a pH of about 3.2, which is the isoelectric point of L-glutamic acid. This amino acid may then be crystallized from the acidic solution. The solution obtained upon removal of glutamic acid at this point comprises a complex mixture of amino acids and substantial amounts of inorganic salts formed by the hydrolytic and neutralizing agents employed. To render the solution or end liquor useful as a nutrient composition, it must be rendered substantially ash-free by removal of the inorganic salts therefrom.

A method for producing an ash-free end liquor is revealed in a patent to Blish, U. S. 2,598,341, issued May 27, 1952. In the aforementioned process, a proteinaceous substance such as wheat gluten is hydrolyzed with sulfuric acid employing conventional conditions of temperature, time, and pressure. The acidic hydrolysate is then adjusted to a pH of between about 9.0 and about 11.0 with a sufficient amount of agent selected from the group consisting of alkaline earth metal oxides, hydroxides, and carbonates. The insoluble salts thus formed are removed, and the resultant solution is heated, preferably in vacuo, until the vapor is substantially free of ammonia. The solution is then adjusted to a pH of between about 5.0 and about 7.0 by the addition of acids or acid anhydrides whose salts with alkaline earth metal are insoluble in water. The insoluble salts thus produced are again separated, and the resultant solution is concentrated beyond the saturation point of tyrosine and leucine.

These neutral amino acids are then separated, and the resultant solution is diluted and adjusted to a pH of between about 2.5 and about 3.8 with 50 per cent sulfuric acid. Insoluble alkaline earth metal sulfate is precipitated at this point and separated from the solution. The resultant solution is then concentrated, preferably in vacuo, and L-glutamic acid crystallized therefrom. The solution from which the glutamic acid has been removed is substantially ash-free and comprises primarily a heterogeneous solution of amino acids. Such a solution has value as a nutrient composition.

One of the disadvantages of this prior process is the fact that small amounts of insoluble salts may settle out during the crystallization of the glutamic acid and thus contaminate it. Therefore, when producing an ash-free end liquor by the process previously described, there is some loss of purity in the glutamic acid product. Likewise, in the aforementioned process it is an incident to dilute the filtrate obtained from the separation of tyrosine and leucine either by the addition of water, if sulfur dioxide is used as an acidifying agent, or simply by adding an acid such as dilute sulfuric acid, which serves both as a diluting agent and an acidifying agent, when finally adjusting the pH about to the isoelectric point of glutamic acid. From a solution so acidified, substantial amounts of calcium sulfate are removed. The resultant solution must then be concentrated to prevent loss of glutamic acid in an unnecessarily large volume of mother liquor. An additional disadvantage of this process is that concentration at this point may cause excessive corrosion of equipment, and the concentration must be carried out with extreme caution to prevent conversion of glutamic acid to pyrrolidone carboxylic acid with accompanying loss of L-glutamic acid.

The principal object of this invention is to produce, by the sulfuric acid hydrolysis of a proteinaceous substance, a substantially ash-free solution having value as a nutrient composition and substantially pure L-glutamic acid.

A further object of this invention is to produce, by sulfuric acid hydrolysis of a proteinaceous compound, substantially pure L-glutamic acid and a substantially ash-free solution comprising essentially amino acids.

Another object of this invention is to produce, by the sulfuric acid hydrolysis of wheat gluten, a solution of amino acids low in ash content, and a product of substantially pure L-glutamic acid.

Another object of this invention is to produce, by sulfuric acid hydrolysis of corn gluten, a solution of amino acids low in ash content, and a product of substantially pure L-glutamic acid.

Other objects of this invention will become apparent upon a fuller understanding of the invention as hereinafter set forth. These objects may be accomplished by the instant novel process, which comprises adding to sulfuric acid hydrolysate of a proteinaceous substance an agent selected from a group consisting of alkaline earth metal oxides, hydroxides, or carbonates in sufficient amounts to obtain a pH of the hydrolysate of between about 8.0 and about 12.0. When the aforesaid compounds are added to the hydrolysate in these amounts, the bulk of the sulfate ions present in the acidic hydrolysate will be removed in the form of insoluble alkaline earth metal sulfates.

In the description and claims of the instant novel process, the terms "L-glutamic acid" or "glutamic acid" are synonymous to 1(+) glutamic acid.

If calcium is selected as the alkaline earth metal, then depending upon the pH at which the excess calcium is removed from the solution as calcium sulfate, either calcium which is uncombined with amino acids or said calcium plus calcium which is combined with amino acids may be substantially removed from the hydrolysate. Thus, as revealed in aforementioned Patent U. S. No. 2,598,341, if the pH of the hydrolysate is adjusted to between 4.0 and 7.0, uncombined calcium, that is, calcium which is not combined with amino acids, may be removed as calcium sulfate; whereas, if the pH is adjusted to between 2.5 and 3.5, both uncombined and combined calcium may be removed from the solution in the form of insoluble calcium salts of the aforesaid acidic reagents. At the pH of between 2.5 and 3.5, there is virtually no combination of calcium with glutamic acid, and under conditions hereinafter described, uncombined glutamic acid may be coprecipitated with water-insoluble calcium salts. The coprecipitate is separated from the end liquor producing thereby a solution of amino acids which is substantially ash-free. The coprecipitate is then mixed with dilute sulfuric acid, and substantially only the glutamic acid is thereby dissolved. The insoluble calcium sulfate is removed from this solution, and the resultant solution containing dissolved glutamic acid is again adjusted to a pH of between 2.5 and 3.8 with either aqueous or gaseous ammonia. From this solution, the glutamic acid is allowed to crystallize. Maximum crystallization takes place in from one to five days. The product when filtered and washed is of a high yield and of a very pure quality ranging from 96 to 99 per cent pure glutamic acid.

In a continuous process, loss of glutamic acid in the mother liquor is prevented by recirculating the mother liquor containing small amounts of ammonium sulfate and glutamic acid in solution to the prior steps of the process wherein the protein hydrolysate contains substantial amounts of calcium in solution so as to convert the ammonium sulfate to calcium sulfate. Removal of the latter is accomplished in a subsequent step as previously described. By this method, accumulation of soluble ash-forming salts in the system is prevented.

As previously mentioned in sulfuric acid hydrolysis of a proteinaceous substance wherein an ash-free end liquor is desired, the pH of the acidic hydrolysate is adjusted to between about 8.0 and about 12.0 by the addition of an agent selected from the group of oxides, hydroxides, or carbonates of alkaline earth metals. In the instant novel process, if for example lime is used in the aforementioned pH adjustment, coprecipitation of calcium sulfate, calcium salts of neutral amino acids such as tyrosine and leucine, and glutamic acid may be accomplished by adjusting the pH of the aforementioned basic solution to a pH of approximately 3.2. The coprecipitate may then be mixed with dilute sulfuric acid and the insoluble calcium separated therefrom. If proteins, which on hydrolysis will subsequently yield neutral amino acids in a relatively large amount, are initially employed as starting material, the coprecipitate obtained upon the direct adjustment of the protein hydrolysate to a pH of approximately 3.2, as previously described, will contain, in addition to glutamic acid, neutral amino acids as well as calcium sulfate. Upon the admixing of this coprecipitate and dilute sulfuric acid, the neutral amino acids are dissolved with the glutamic acid, and upon the readjustment of the pH to approximately 3.2, there will result a heterogeneous mixture of glutamic acid and neutral amino acids. The preferred embodiment of the instant novel process is to first effect removal of these amino acids at a pH range of between about 5.0 and about 7.0, by means previously described, so that they no longer interfere with the ultimate recovery of substantially pure glutamic acid. Thus, if the starting material is a proteinaceous substance, for example a cereal, such as wheat gluten or corn gluten, acid hydrolysis may be carried out by mixing the cereal gluten with about two parts by weight of 50 per cent by weight sulfuric acid per part of protein desired to be hydrolyzed. The acidic mixture is heated for several hours at a temperature of between about 100° C. and about 150° C., until substantially all of the protein values have been degraded into individual amino acids. The resultant acidic hydrolysate is then treated with lime to give the hydrolysate a pH of between about 8.0 and about 12.0, preferably between about 10.5 and about 12.0. Upon separation of calcium sulfate thus formed, substantially all of the sulfate ions are removed as well as certain insoluble organic material, principally humin. The resultant alkaline solution is then heated and/or evaporated until the vapor therefrom is substantially free from ammonia. The resultant solution is then adjusted to a pH of between about 4.0 and about 7.0 by adding thereto sulfuric acid, sulfur dioxide, or any acidic material selected from the group consisting of acids and acid anhydrides whose salts with alkaline earth metals are substantially water-insoluble. Insoluble material comprising alkaline earth metal salts precipitate from the adjusted solution and may be removed therefrom by any suitable means such as by filtration or centrifugation. The resultant solution is then evaporated, preferably in vacuo, beyond the saturation point of tyrosine and leucine, and upon cooling, the aforesaid amino acids together with minor amounts of other amino acids including methionine, phenylalanine, and valine are crystallized from the solution. The concentrated solution resulting from the separation of the aforesaid amino acids from the hydrolysate may then be treated with an additional amount of sulfuric acid or sulfur dioxide to give the solution a pH of between about 2.5 and about 3.5. The glutamic acid and the insoluble calcium salt thus formed are then allowed to settle out together. This coprecipitate is recovered and then mixed with sufficient dilute sulfuric acid to dissolve the glutamic acid component of the coprecipitate and to adjust the pH to between about 0.5 and about 0.9. The slurry is vigorously stirred to insure that the glutamic acid is completely dissolved therein. The insoluble material, mostly calcium sulfate, is separated from the solution, and the resultant solution is readjusted to a pH of between 2.5 and 3.8, preferably 3.2, with either aqueous or gaseous ammonia. Glutamic acid can then be crystallized from this solution and when separated therefrom, washed and dried, yields a substantially pure ash-free product. The mother liquor from the final crystallization step, as well as any purification liquors, may then be recycled to the point in the continuous process where lime is first added to the acidic hydrolysate or to any other point in the process where the hydrolysate has been rendered alkaline by an excess of alkaline earth metal oxides, hydroxides, or carbonates. Since the mother and purification liquors contain primarily ammonium sulfate and uncrystallized glutamic acid, there is no accompanying build up of soluble ash-forming salts, due to the fact that the ammonium sulfate is converted to calcium sulfate at the place of addition and is, as previously described, substantially completely removed in subsequent steps.

The instant process is applicable to the treatment of any proteinaceous material such as wheat gluten, corn gluten, casein, peanut meal, soybean meal, cottonseed meal, albumin, linseed meal, flaxseed meal, blood meal, and similar proteinaceous materials.

The term "acidic material" as used in the claims and description is meant to include material selected from the group consisting of acids and acid anhydrides whose salts with alkaline earth metals are substantially water-insoluble, such as sulfur dioxide, sulfuric acid and carbon dioxide.

In order to more fully illustrate the nature and character of the invention but with no intention of being limited thereby, the following examples are given:

Example I

About 200 grams of wheat gluten was hydrolyzed by heating the same with about 400 grams of sulfuric acid containing about 50 per cent $H_2SO_4$ by weight, for a period of between about six or about twelve hours at a temperature of about 115° C. After cooling the hydrolysate, an equal volume of water was added thereto. An aqueous slurry containing about 250 grams of hydrated lime was added to the dilute hydrolysate, resulting in a mixture having a pH of about 11.6. This resulted in the formation of a precipitate of calcium sulfate which was removed from the alkaline mixture together with insoluble organic material or humin produced during hydrolysis. The alkaline solution which contained a large amount of calcium sulfate wash water was then concentrated in vacuo by heating at a temperature of between about 50° C. and about 85° C. to about 60 per cent of its original volume, thereby removing substantially all of the ammonia from the hydrolysate. To the concentrated solution was added $SO_2$ until the pH thereof was reduced to about 5.2. The insoluble calcium sulfite which precipitated from the adjusted solution was removed therefrom by filtration, and the filtrate was concentrated in vacuo at a temperature of about 60° C. Upon cooling this concentrate, a mixture of amino acids, principally tyrosine and leucine, together with minor amounts of methionine, phenylalanine, and valine, and other amino acids crystallized therefrom. These insoluble amino acids were removed from the solution by filtration, and the resultant solution was adjusted to a pH of about 3.2 with sulfuric acid. The insoluble calcium sulfate and glutamic acid were allowed to settle out together. This coprecipitate was then separated from the solution by filtration, its weight dry being 115 grams of crude glutamic acid-calcium sulfate mixture. To this mixture was added about 200 milliliters of water. The glutamic acid was then dissolved by adjusting the slurry to a pH of 0.7 with sulfuric acid. After stirring for several minutes, the slurry was filtered, and the insoluble ($CaSO_4$) cake washed with water. Glutamic acid was crystallized from the filtrate by readjusting the same to pH 3.2 with aqueous ammonia. After standing overnight, glutamic acid was filtered off, washed sparingly, and dried. The dried glutamic acid weighed 49 grams and was practically 100 per cent pure (by optical rotation determination) and substantially ash-free.

Example II

About 100 grams of Maco corn gluten was hydrolyzed by heating the same with about 200 grams of about 50 per cent sulfuric acid for a period of between about 6 hours and about 12 hours at a temperature of about 115° C. After cooling the hydrolysate, an equal volume of water was added thereto. Sufficient aqueous slurry of hydrated lime was added to the dilute hydrolysate to produce a pH of about 11.6. Calcium sulfate precipitated and was removed from the alkaline mixture together with insoluble organic material or humin produced during the hydrolysis. The alkaline solution which contained a large amount of calcium sulfate wash water was then concentrated in vacuo by heating at a temperature of about 50° C. and about 85° C. to about 60 per cent of its original volume, thereby removing substantially all of the ammonia from the hydrolysate. To the concentrated solution was added $SO_2$ until the pH thereof was reduced to about 5.2. The insoluble calcium sulfite which precipitated from the adjusted solution was removed therefrom by filtration, and the filtrate was concentrated in vacuo at a temperature of about 60° C. Upon cooling this concentrate, a mixture of amino acids, principally tyrosine and leucine, together with minor amounts of methionine, phenylalanine, and valine, and other amino acids crystallized therefrom. These insoluble amino acids were removed from the solution by filtration, and the resultant solution was adjusted to a pH of about 3.2 with sulfuric acid. The insoluble calcium sulfate and glutamic acid were allowed to settle out together. This coprecipitate was then separated from the solution by filtration, its weight dry being about 42 grams of crude glutamic acid-calcium sulfate mixture. To this mixture was added about 80 milliliters of water. The glutamic acid was then dissolved by adjusting the pH of the slurry to about 0.7 with sulfuric acid. After stirring for several minutes, the slurry was filtered, and the insoluble calcium sulfate cake washed with water. Glutamic acid was crystallized from the filtrate by readjusting the same to a pH of about 3.2 with aqueous ammonia. After standing overnight, glutamic acid was filtered from the solution, washed, and dried. The dried glutamic acid weighed about 10 grams and was practically 100 per cent pure and substantially ash-free.

This application is a continuation-in-part of copending application, Serial No. 77,059, filed February 17, 1949.

Having thus fully described the nature and character of the invention, what is desired to be secured by Letters Patent is:

1. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8 and about 12 and separating insoluble material therefrom; the improvements comprising adding to the resultant solution acidic material selected from the group consisting of acids and acid anhydrides whose salts with alkaline earth metals are substantially water-insoluble in sufficient amount to coprecipitate a mixture of glutamic acid and water-insoluble salts of alkaline earth metals, separating the coprecipitate from the aforesaid solution, selectively dissolving the glutamic acid in the coprecipitate, separating the insoluble salts of alkaline earth metals from the glutamic acid-containing solution, and crystallizing glutamic acid from the solution so separated.

2. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising adding to the resultant solution acidic material in sufficient amount to coprecipitate a mixture of glutamic acid and water-insoluble salts of alkaline earth metals, separating the coprecipitate from the aforesaid solution, dissolving the glutamic acid in dilute sulfuric acid, separating the insoluble salts of alkaline earth metals therefrom, adjusting the pH of the resultant solution to between about 2.5 and about 3.5, crystallizing the glutamic acid, and separating crystallized glutamic acid therefrom.

3. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising heating the resultant alkaline solution until the vapor therefrom is substantially free from ammonia, adding to the resultant solution acidic material sufficient to give the said solution a pH of between about 2.5 and about 3.5, coprecipitating from the resultant solution a mixture of water-insoluble salts of alkaline earth metals and glutamic acid, separating the coprecipitate from the end liquor, dissolving the glutamic acid in dilute sulfuric acid, separating the insoluble salts of alkaline earth metals therefrom, adjusting the pH of the resultant solution to between about 2.5 and about 3.5 with aqueous ammonia, and obtaining therefrom crystalline glutamic acid, the entire process being conducted in the substantial absence of alkali metals and their compounds.

4. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising heating the resultant alkaline solution until the vapor therefrom is substantially free from ammonia, adding to the resultant solution acidic material in an amount sufficient to give the said solution a pH of between about 4.0 and about 7.0, separating insoluble matter comprising insoluble alkaline earth metal salts from the adjusted solution, concentrating the resultant solution beyond the saturation points of tyrosine and leucine, cooling the concentrate and separating said amino acids therefrom, treating the resultant solution with an additional amount of the aforesaid acidic material to give said solution a pH between about 2.5 and about 3.5, thereby coprecipitating a mixture of alkaline earth metal salts and glutamic acid, separating said coprecipitate from the resultant solution, dissolving the glutamic acid in dilute sulfuric acid, separating therefrom the insoluble alkaline earth metal salts, adjusting the pH of the resultant solution to between about 2.5 and about 3.5 with aqueous ammonia and crystallizing therefrom substantially pure glutamic acid.

5. A process according to claim 4, wherein the proteinaceous composition comprises essentially wheat gluten.

6. A process according to claim 4, wherein the proteinaceous composition comprises essentially corn gluten.

7. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising heating the resultant alkaline solution until the vapor therefrom is substantially free from ammonia, treating the resultant solution with acidic material in an amount sufficient to give said solution a pH of between about 5.0 and about 7.0, separating insoluble alkaline earth metal salts of the aforesaid acidic material from the solution, treating the solution with sulfuric acid in an amount sufficient to give said solution a pH of between about 2.5 and about 3.5, coprecipitating a mixture of glutamic acid and sulfate of alkaline earth metals, separating the coprecipitate from the aforesaid solution, dissolving the glutamic acid in dilute sulfuric acid, separating the sulfate of alkaline earth metals therefrom, adjusting with aqueous ammonia the pH of the resultant solution to between about 2.5 and about 3.5, crystallizing the glutamic acid, and separating the same therefrom, thereby obtaining substantially pure glutamic acid and substantially ash-free end liquor.

8. In a process involving the sulfuric acid hydrolysis of wheat gluten, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising heating the resultant alkaline solution until the vapor therefrom is substantially free from ammonia, treating the resultant solution with acidic material in an amount sufficient to give said solution a pH of between about 5.0 and about 7.0, separating insoluble alkaline earth metal salts of the aforesaid acidic material from the solution, treating the solution with sulfuric acid in an amount sufficient to give said solution a pH of between about 2.5 and about 3.5, coprecipitating a mixture of glutamic acid and sulfate of alkaline earth metals, separating the coprecipitate from the aforesaid solution, dissolving the glutamic acid in dilute sulfuric acid, separating the sulfate of alkaline earth metals therefrom, adjusting with aqueous ammonia the pH of the resultant solution to between about 2.5 and about 3.5, crystallizing the glutamic acid, and separating the same therefrom, thereby obtaining substantially pure glutamic acid and substantially ash-free end liquor.

9. In a process involving the sulfuric acid hydrolysis of corn gluten, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising heating the resultant alkaline solution until the vapor therefrom is substantially free from ammonia, treating the resultant solution with acidic material in an amount sufficient to give said solution a pH of between about 4.0 and about 7.0, separating insoluble alkaline earth metal salts of the aforesaid acidic material from the solution, treating the solution with sulfuric acid in an amount sufficient to give said solution a pH of between about 2.5 and about 3.5, coprecipitating a mixture of glutamic acid and sulfate of alkaline earth metals, separating the coprecipitate from the aforesaid solution, dissolving the glutamic acid in dilute sulfuric acid, separating the sulfate of alkaline earth metals therefrom, adjusting with aqueous ammonia the pH of the resultant solution to between about 2.5 and about 3.5, crystallizing the glutamic acid, and separating the same therefrom, thereby obtaining substantially pure glutamic acid and substantially ash-free end liquor.

10. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising adjusting the pH of the resultant solution to about 2.5 and about 3.5 with acidic material, thereby coprecipitating a mixture of glutamic acid and salts of alkaline earth metals, separating the coprecipitate from the aforesaid solution, dissolving the glutamic acid in dilute sulfuric acid, separating the salts of alkaline earth metals therefrom, adjusting the pH of the resultant solution with gaseous ammonia to between about 2.5 and about 3.5, crystallizing the glutamic acid, and separating the same therefrom.

11. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising heating the resultant alkaline solution until the vapor therefrom is substantially free from ammonia, treating the resultant solution with sulfur dioxide in an amount sufficient to give said solution a pH of between about 5.0 and about 7.0, separating insoluble calcium sulfite from the resultant mixture, concentrating the resultant solution beyond the saturation point of tyrosine and leucine, cooling the concentrate and separating said amino acids therefrom, treating the resultant solution with sulfuric acid in an amount sufficient to give the same a pH of between about 2.5 and about 3.5, thereby coprecipitating a mixture of glutamic acid and calcium sulfate, separating the coprecipitate from the aforesaid solution, adding to the coprecipitate twice the amount of water by weight, adjusting the resultant slurry to a pH of 0.7 with sulfuric acid, separating therefrom insoluble calcium sulfate, adjusting the resultant solution to a pH of 3.2 with aqueous ammonia, and crystallizing therefrom glutamic acid.

12. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising adding to the resultant solution acidic material in sufficient amount to coprecipitate a mixture of glutamic acid and water-insoluble salts of alkaline earth metals, separating the coprecipitate from the aforesaid solution, dissolving the glutamic acid in dilute sulfuric acid, separating the insoluble salts of alkaline earth metals therefrom, adjusting the pH of the resultant solution to between about 2.5 and about 3.5, crystallizing the glutamic acid and separating crystallized glutamic acid therefrom, and recycling the glutamic acid mother liquor thereby obtained to the alkalinized protein hydrolysate.

13. In a process involving the sulfuric acid hydrolysis of a proteinaceous composition, followed by treating the hydrolysate with a sufficient amount of agent selected from the group consisting of alkaline earth metal oxides, hydroxides, and carbonates to give the hydrolysate a pH of between about 8.0 and about 12.0, and separating insoluble matter therefrom; the improvements comprising heating the resultant alkaline solution until the vapor therefrom is substantially free from ammonia, treating the resultant solution with acidic material in an amount sufficient to give said solution a pH of between about 5.0 and about 7.0, separating insoluble alkaline earth metal salts of said acids from the resultant mixture, concentrating the resultant solution to the saturation point of tyrosine and leucine, cooling the concentrate and separating said amino acids therefrom, treating the resultant solution with sulfuric acid in an amount sufficient to give the same a pH of between about 2.5 and about 3.5, coprecipitating a mixture of glutamic acid and sulfate of alkaline earth metals, separating the coprecipitate from the aforesaid solution, dissolving the glutamic acid in dilute sulfuric acid, separating the sulfate of alkaline earth metals therefrom, adjusting the pH of the resultant solution with gaseous ammonia to between about 2.5 and about 3.5, crystallizing the glutamic acid and separating the same therefrom, and recycling the glutamic acid mother liquor thereby obtained to the alkalinized protein hydrolysate.

FOREST A. HOGLAN.

References Cited in the file of this patent

UNITED STATES PATENTS

| Number | Name | Date |
|---|---|---|
| 1,035,591 | Ikeda et al. | Aug. 13, 1912 |
| 2,347,220 | Shildneck | Apr. 25, 1944 |
| 2,373,342 | Royal | Apr. 10, 1945 |
| 2,433,219 | Hoglan | Dec. 23, 1947 |
| 2,525,902 | Hoglan et al. | Oct. 17, 1950 |
| 2,533,114 | Hoglan et al. | Dec. 5, 1950 |
| 2,598,341 | Blish | May 27, 1952 |